(12) United States Patent
Wong

(10) Patent No.: US 7,479,641 B2
(45) Date of Patent: Jan. 20, 2009

(54) ULTRA VIOLET DETECTOR/INDICATOR

(76) Inventor: Tommy Chi-Kin Wong, No. 1 Yulan Road, Dongsha Industrial Park, Fangcun, Liwan District, Guangzhou (CN)

(*) Notice: Subject to any disclaimer, the term of this patent is extended or adjusted under 35 U.S.C. 154(b) by 0 days.

(21) Appl. No.: 11/518,900

(22) Filed: Sep. 12, 2006

(65) Prior Publication Data
US 2007/0007467 A1     Jan. 11, 2007

Related U.S. Application Data
(63) Continuation-in-part of application No. 10/423,897, filed on Apr. 28, 2003, now Pat. No. 7,141,222.

(30) Foreign Application Priority Data
Nov. 16, 2005    (CN) .................. 2005 1 0101484

(51) Int. Cl.
  *G01J 1/42* (2006.01)
(52) U.S. Cl. .................................... 250/372
(58) Field of Classification Search ........... 250/372
  See application file for complete search history.

(56) References Cited

U.S. PATENT DOCUMENTS

| | | | | |
|---|---|---|---|---|
| 2,748,289 | A * | 5/1956 | Urbach | 250/486.1 |
| 3,597,054 | A * | 8/1971 | Winter | 351/48 |
| 4,103,167 | A * | 7/1978 | Ellner | 250/432 R |
| 4,255,665 | A * | 3/1981 | Shriner | 250/483.1 |
| 4,892,712 | A | 1/1990 | Robertson et al. | |
| 5,281,823 | A * | 1/1994 | Weltz et al. | 250/372 |
| 5,589,398 | A * | 12/1996 | Krause et al. | 436/164 |
| 5,992,996 | A * | 11/1999 | Sawyer | 351/158 |
| 6,054,256 | A * | 4/2000 | Nohr et al. | 430/339 |
| 6,117,337 | A | 9/2000 | Gonzalez-Martin et al. | |
| 6,211,526 | B1 * | 4/2001 | Huston et al. | 250/484.4 |
| 6,271,528 | B1 * | 8/2001 | Struye et al. | 250/484.5 |
| 6,431,528 | B1 | 8/2002 | Kojima et al. | |
| 6,451,202 | B1 * | 9/2002 | Kuennen et al. | 210/136 |
| D468,438 | S * | 1/2003 | Wong | D24/217 |
| 6,657,205 | B1 * | 12/2003 | Wong | 250/438 |
| 6,791,092 | B2 * | 9/2004 | Hamilton | 250/373 |

(Continued)

FOREIGN PATENT DOCUMENTS
EP      0982572 A1     1/2000

(Continued)

*Primary Examiner*—David P Porta
*Assistant Examiner*—David S Baker
(74) *Attorney, Agent, or Firm*—Rabin & Berdo, P.C.

(57) ABSTRACT

An ultraviolet detector/indicator comprises of a column, hemisphere, cake, or wire where a light receiving front and a light emitting front are respectively installed on the two ends with connections, and a light guide unit, which contains the material that strengthens the ultraviolet or adjusts the spectrum is installed between the two fronts. According to the foregoing structure, the ultraviolet detector/indicator installed in the enclosure of an ultraviolet sterilization apparatus is exempted from the external power source for transferring invisible ultraviolet into visible light. In addition, a calorimetric scale printed with various color shades is installed to assist the user in verifying the ultraviolet strengths should aging or damage of the ultraviolet lamp fail functions of the apparatus. Furthermore, an interface connecting to the enclosure is installed to facilitate the replacement of ultraviolet detector/indicator.

19 Claims, 11 Drawing Sheets

U.S. PATENT DOCUMENTS

| | | | |
|---|---|---|---|
| 7,141,222 B2 * | 11/2006 | Wong | 422/186.3 |
| 7,175,808 B2 * | 2/2007 | Gunn et al. | 422/44 |
| 2004/0046127 A1 * | 3/2004 | Wong | 250/437 |
| 2004/0182761 A1 * | 9/2004 | Kuennen et al. | 210/136 |
| 2004/0213710 A1 * | 10/2004 | Wong | 422/186.3 |
| 2006/0145091 A1 * | 7/2006 | Patel | 250/474.1 |
| 2007/0267356 A1 * | 11/2007 | Wong | 210/748 |

FOREIGN PATENT DOCUMENTS

| | | | |
|---|---|---|---|
| EP | 982572 A1 * | 3/2000 |
| EP | 1382572 A1 * | 1/2004 |
| EP | 1788368 A1 * | 5/2007 |
| EP | 1848022 A1 * | 10/2007 |
| EP | 1857416 A2 * | 11/2007 |
| WO | WO 0192839 A2 * | 12/2001 |

* cited by examiner

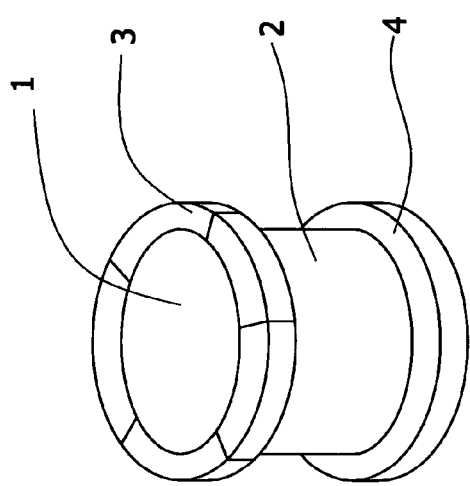
Fig.1
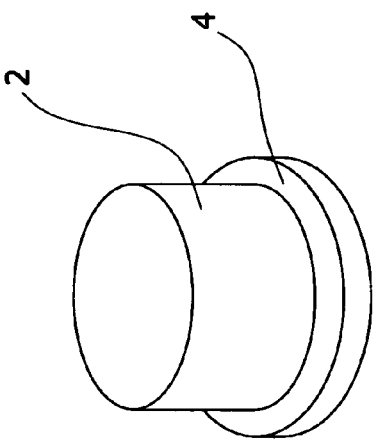
Fig.1-3
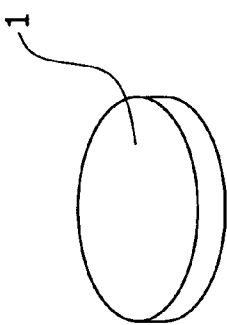
Fig.1-2
Fig.1-1

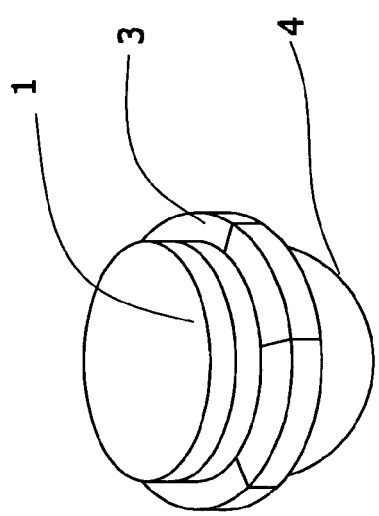
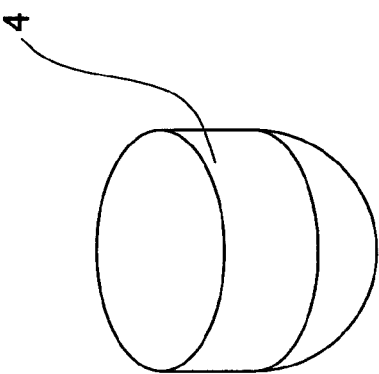
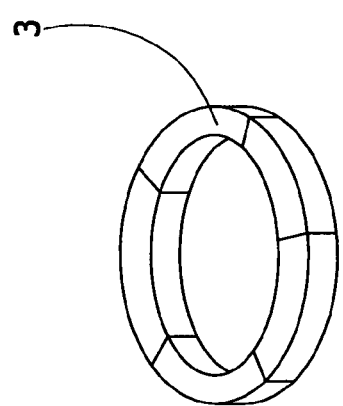
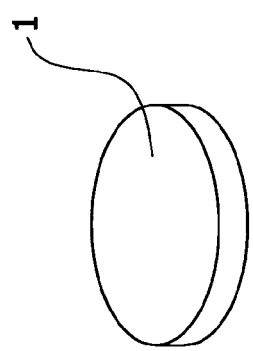
Fig.2
Fig.2-1
Fig.2-2
Fig.2-3

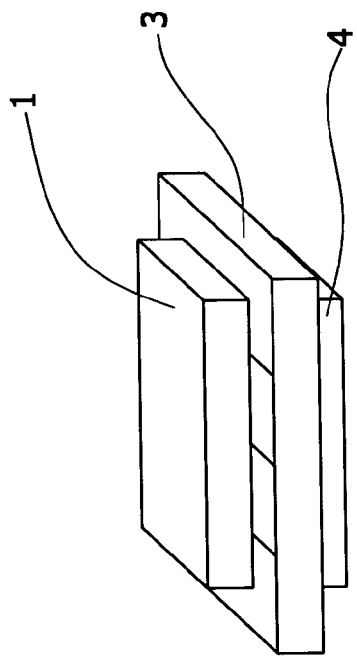
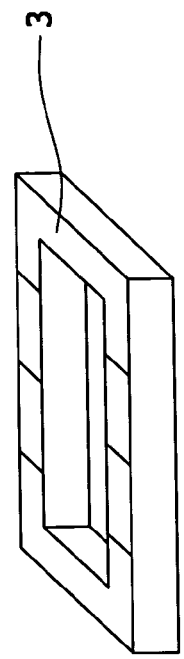
Fig.3
Fig.3-3
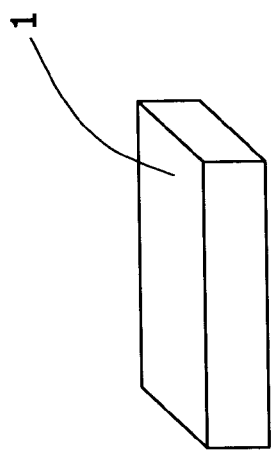
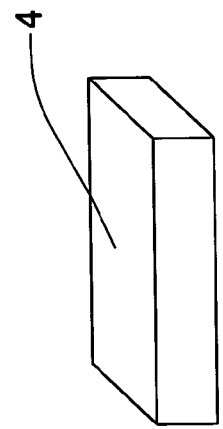
Fig.3-1
Fig.3-2

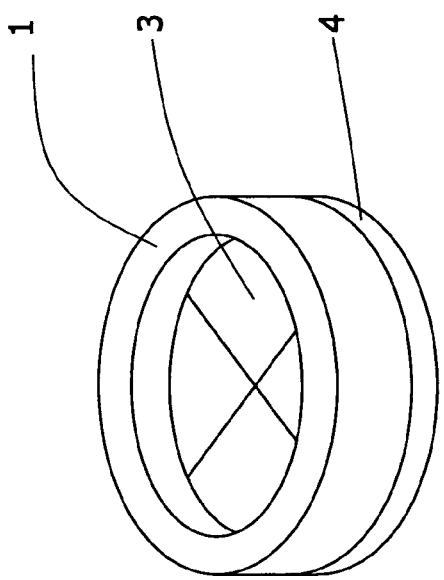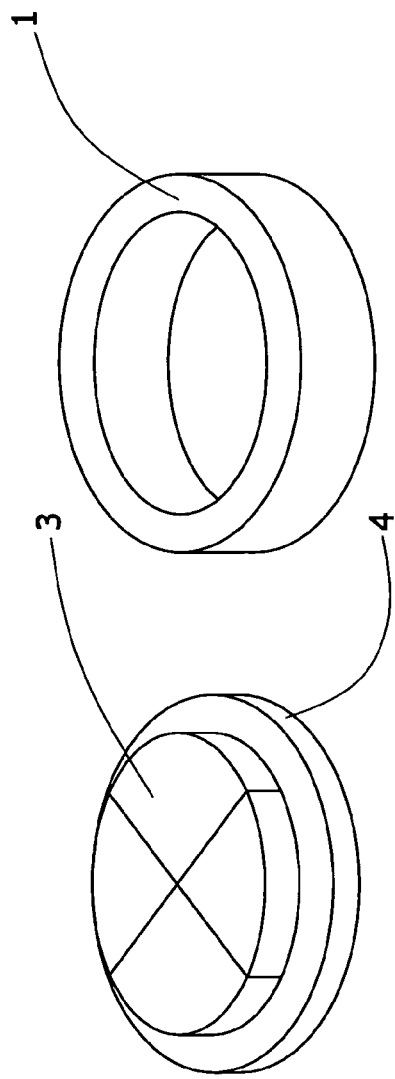
Fig.4
Fig.4-1
Fig.4-2

US 7,479,641 B2

ULTRA VIOLET DETECTOR/INDICATOR

RELATED APPLICATION

This application is a Continuation-In-Part of U.S. patent application Ser. No. 10/423,897, filed Apr. 28, 2003.

BACKGROUND OF THE INVENTION

I. Field of the Invention

The invention relates to an "ultraviolet detector/indicator", more particularly, an indicator installed in an apparatus utilizing the ultraviolet light for sterilization and photo purification, the ultraviolet cure apparatus, or any ultraviolet-functioned apparatus to alert replacement of the ultraviolet lamp.

II. Description of the Prior Art

With reference to the existing technology, the ultraviolet sterilization and photo purification apparatus, the ultraviolet cure apparatus, or any apparatus utilizing the ultraviolet for sterilization, detection, and indication of the ultraviolet strengths rely on an electronic sensor that has digital readings. However, the electronic sensor of the prior art is inconvenient in terms of utilization and maintenance because it is comparatively expensive and needs an external power source to support its operation.

SUMMARY OF THE INVENTION

The objective of the invention is to provide an "ultraviolet detector/indicator" to solve the technical issues caused by aging or damage of the ultraviolet lamp, which consequently fails all the functions of ultraviolet sterilization and photo purification apparatus.

To achieve the foregoing objective, the invention adopts embodiments as follows:

An ultraviolet detector/indicator, whose body is a column, hemisphere, cake, or wire, which comprises of a light receiving front on one end and a light emitting front on the other.

The ultraviolet detector/indicator described by the invention, whose body is either of a column or cake type, in which a light guide unit is installed between the back of the light receiving and light emitting fronts. The light guide unit may be a column or a flexible wire.

The material strengthening the light or adjusting the spectrum permeates through the ultraviolet detector/indicator described by the invention.

A calorimetric scale printed with various color shades is installed around or beside the light emitting front of the ultraviolet detector/indicator described by the invention.

The material transferring ultraviolet energy into visible light permeates through the light receiving front of the ultraviolet detector/indicator described by the invention.

The material permeating through the light receiving front of the ultraviolet detector/indicator described by the invention is silica gel and its derivatives, PTFE (Polytetrafluoroethylene) and its derivatives, or PMMA (Poly Methyl Methacrylate) and its derivatives.

The light receiving front described by the invention is an object pervious to ultraviolet and wherein permeates the material transferring the ultraviolet energy into red light.

The light receiving front described by the invention is an object pervious to ultraviolet and wherein permeates the material transferring the ultraviolet energy into green light.

The light receiving front described by the invention is an object pervious to ultraviolet and wherein permeates the material transferring the ultraviolet energy into yellow light.

The light receiving front described by the invention is an object pervious to ultraviolet and wherein permeates the fluorescent powder emitting colored light.

The light receiving front described by the invention is an object pervious to ultraviolet and wherein permeates the phosphorus emitting visible light.

The material transferring the ultraviolet energy into colored visible light is lodged in a hollow cubic of the ultraviolet detector/indicator described by the invention.

Characters or signs, pervious or opaque to visible light emitted by the indication point, are installed on the surface of the light emitting front of the ultraviolet detector/indicator described by the invention.

An interface of the enclosure is installed in the ultraviolet detector/indicator described by the invention.

Compared to the existing technology, the one adopted by the invention exempts the light emitting front, enclosed in the ultraviolet sterilization and photo purification apparatus, from the external power source for transferring the invisible ultraviolet into colored visible light. In addition, the calorimetric scale printed with various color shades assists the user in verifying the ultraviolet strengths should the apparatus fail in all its functions due to aging or damage of the ultraviolet lamp. Furthermore, an interface is installed to the apparatus enclosure for facilitating the replacement.

BRIEF DESCRIPTION OF THE DRAWINGS

FIG. 1 is a sectional view showing embodiment 1 of the present invention.

FIG. 1-1, 1-2, and 1-3 are sectional views showing parts of embodiment 1 per FIG. 1.

FIG. 2 is a sectional view showing embodiment 2 of the present invention.

FIG. 2-1, 2-2, and 2-3 are sectional views showing parts of embodiment 2 per FIG. 2.

FIG. 3 is a sectional view showing embodiment 3 of the present invention.

FIG. 3-1, 3-2, and 3-3 are sectional views showing parts of embodiment 3 per FIG. 3.

FIG. 4 is a sectional view showing embodiment 4 of the present invention.

FIG. 4-1 and 4-2 are sectional views showing parts of embodiment 4 per FIG. 4.

FIG. 7-1 is a sectional view showing application 3 of the present invention—installation in an ultraviolet sterilization and photocatalyzed liquid processing apparatus.

FIG. 7-2 is a sectional view showing the ultraviolet detector/indicator for application 3 per FIG. 7-1.

FIG. 8-1 and 8-2 are sectional views showing two embodiments of the light receiving front.

FIG. 10-1 to 10-6 are structural views showing two embodiments of the interface.

DESCRIPTION OF THE PREFERRED EMBODIMENT

Further structure, installation, and desirable features of the invention will be better understood from the detailed description and drawings that follow in which various embodiments of the disclosed invention are illustrated by way of example.

Figures 1, 7:
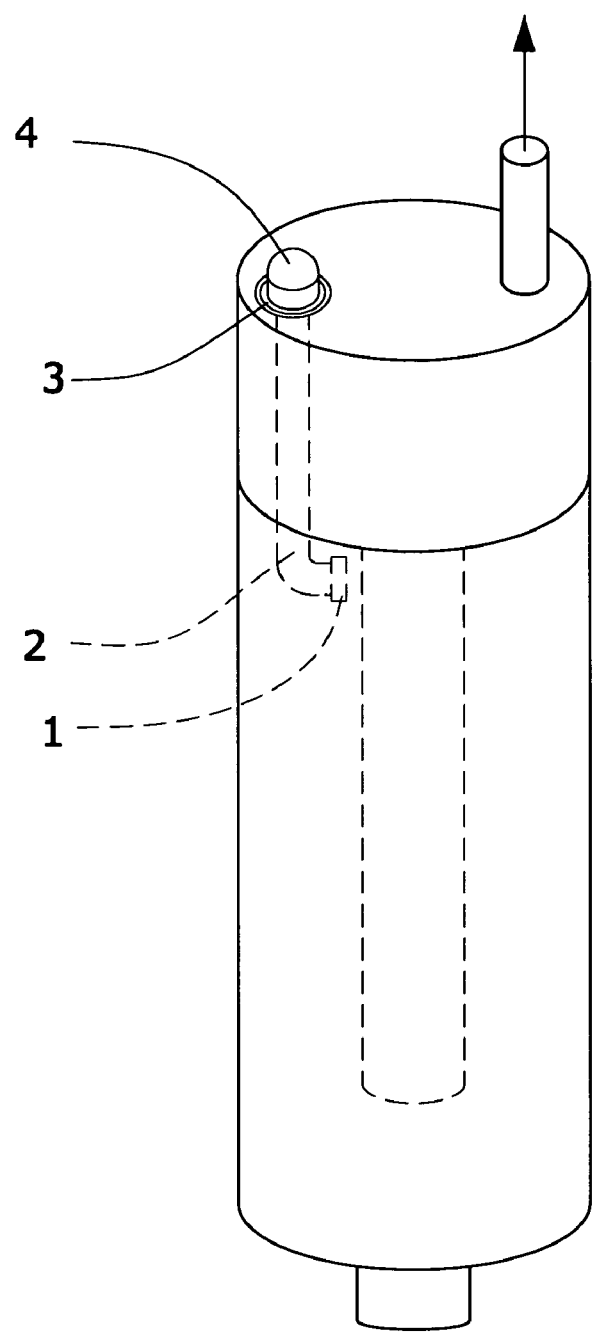

FIG. 1 is a sectional view showing embodiment 1 of the invention, wherein the ultraviolet detector/indicator is a column, comprising of a light receiving front 1 installed on one end, a light emitting front 4 installed on the other end, a light guide unit 2 installed between the two fronts as well as a colorimetric scale 3 which is printed with various color shades and rims respective to the two fronts on the ends. The light receiving front 1, light emitting front 4 and light guide unit 2 may be separate units or may be integrated into a collective structure.

Figures 2, 7:
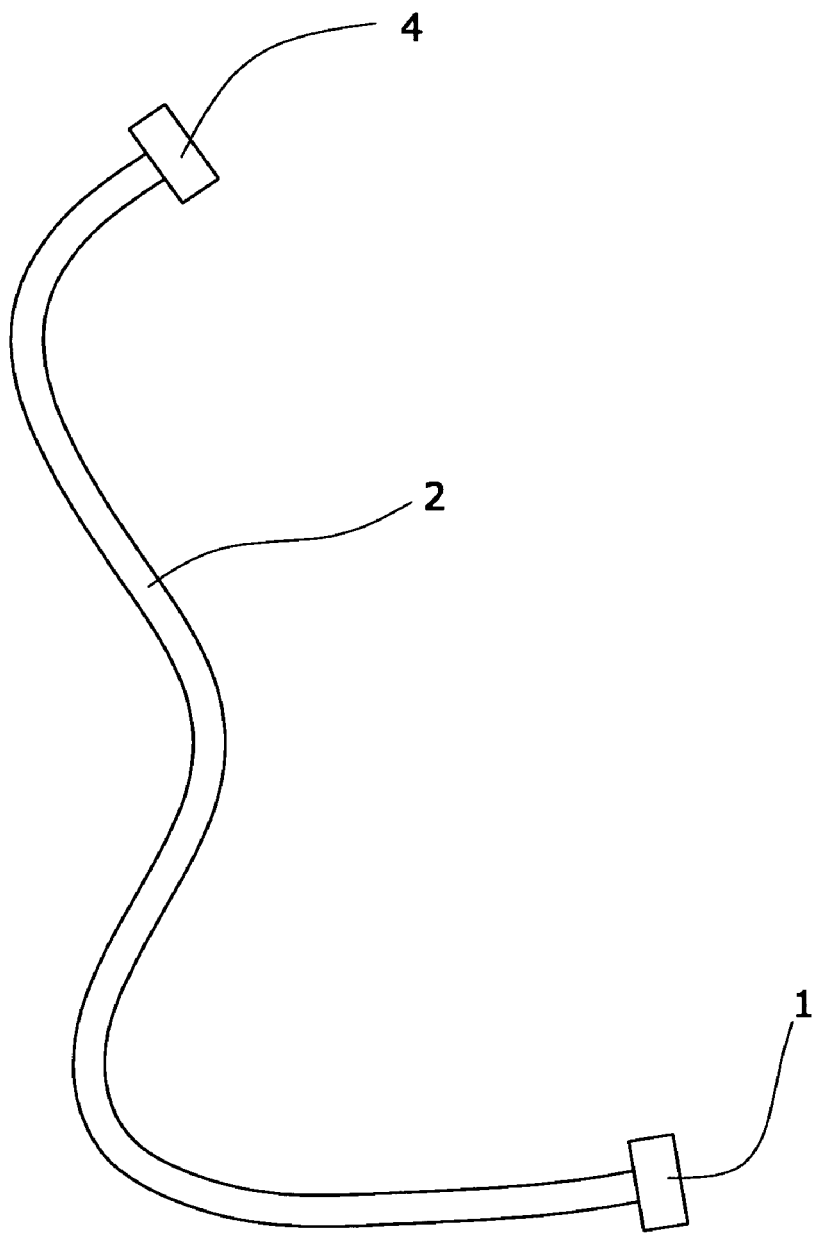

FIG. 2 is a sectional view showing embodiment 2 of the invention, wherein the ultraviolet detector/indicator is a column comprised of a light receiving front 1 installed on one end, a light emitting front 4 installed on the other end as well as a colorimetric scale 3, which is printed with various color shades and sleeves the column body.

Figures 3, 10:
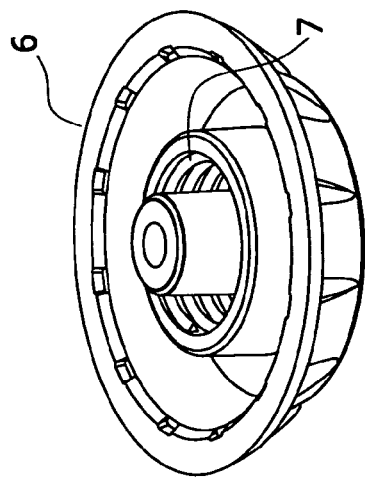
Figures 6, 10:
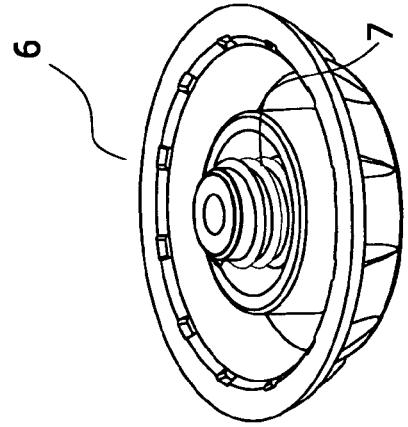
Figures 2, 10:
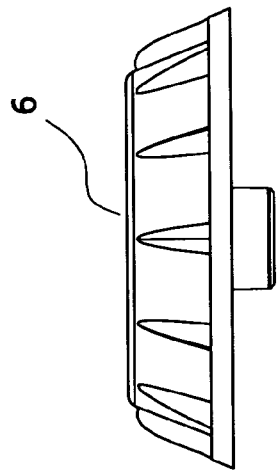
Figures 5, 10:
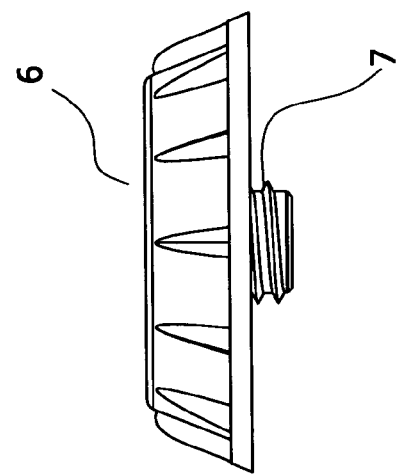
Figures 1, 10:
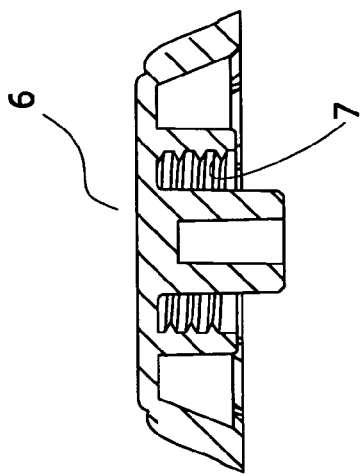

FIG. 3 is a sectional view showing embodiment 3 of the invention, wherein the ultraviolet detector/indicator is a cake comprised of a light receiving front 1 installed on one end, a light emitting front 4 installed on the other end as well as a colorimetric scale 3, which is printed with various color shades and edged on the cake.

Figures 4, 10:
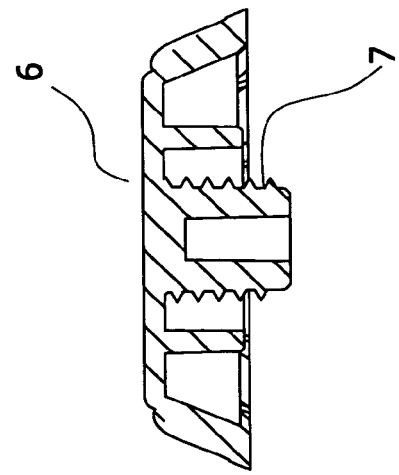

FIG. 4 is a sectional view showing embodiment 4 of the invention, wherein the ultraviolet detector/indicator is a ring, comprising of a light receiving front 1 installed on one end, a light emitting front 4 installed on the other end as well as a colorimetric scale 3, which is printed with various color shades and embraced by the ring.

Figure 5:
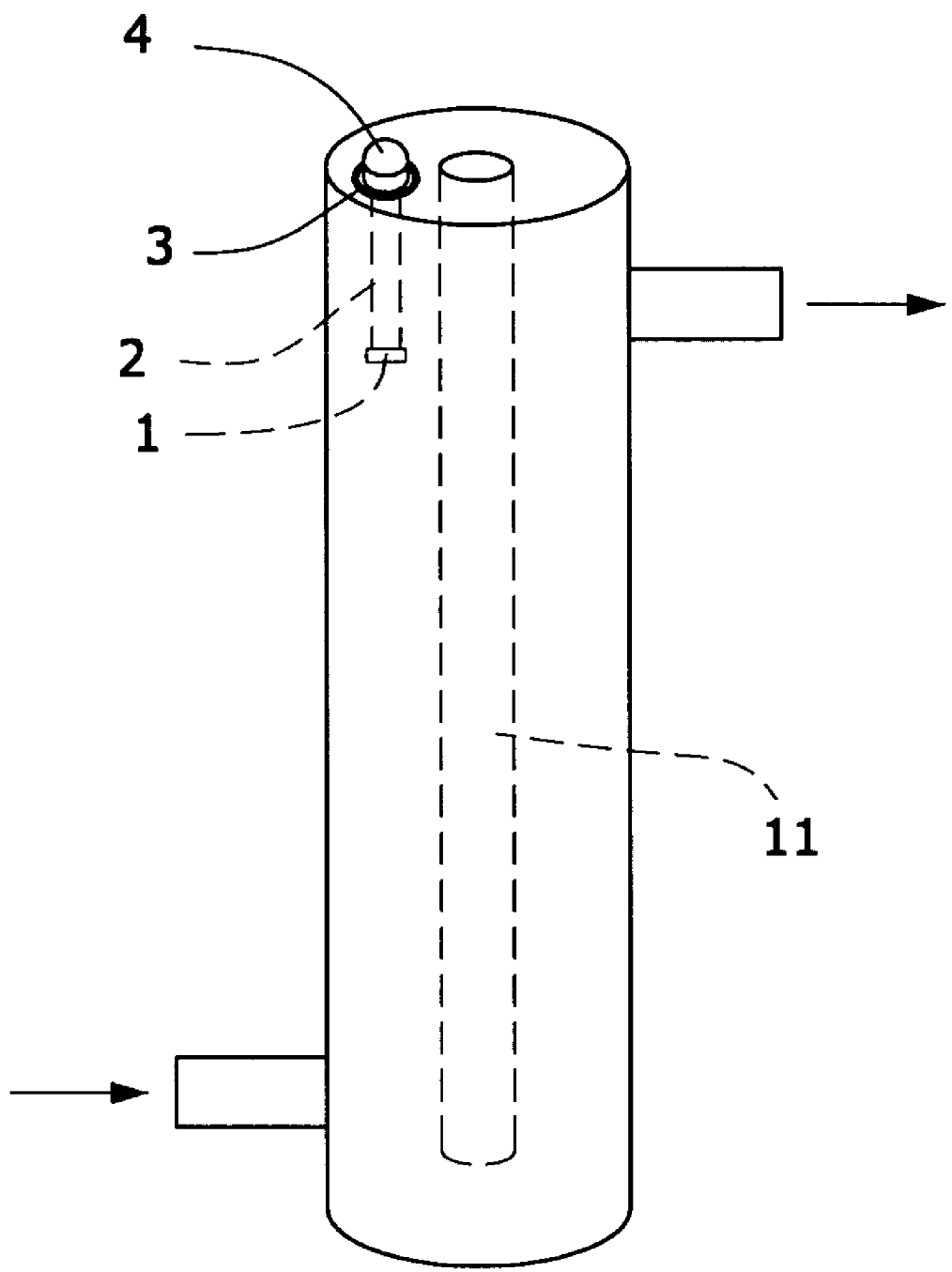
FIG. 5 is a sectional view showing application 1 of the present invention—installation in an ultraviolet sterilization and photocatalyzed liquid process apparatus.

FIG. 5 is a sectional view showing application 1 of the invention where the ultraviolet detector/indicator is installed on the external wall of the enclosure of a photocatalyzed liquid processing apparatus 10, wherein an ultraviolet lamp 11 is installed for sterilization.

The ultraviolet detector/indicator for application 1 per FIG. 5 comprises of a light emitting front 4, a light guide unit 2 extending from the light emitting front down to connect the light receiving front, a light receiving front 1 as well as a colorimetric scale 3, cincturing the walls of the enclosure of the light receiving front 4.

Figure 6:
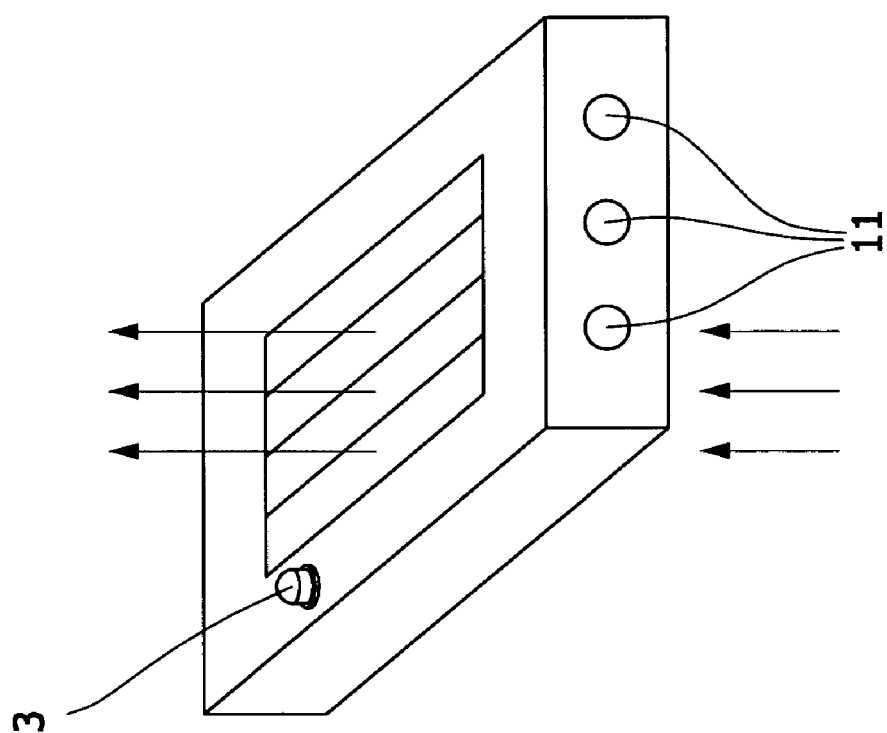
FIG. 6 is a sectional view showing application 2 of the present invention—installation in an ultraviolet sterilization and photocatalyzed vapor processing apparatus.

FIG. 6 is a sectional view showing application 2 of the invention where the ultraviolet detector/indicator is installed on the enclosure of a photocatalyzed vapor processing apparatus 10, wherein the ultraviolet lamp 11 is installed for sterilization. The light emitting front 4 and colorimetric scale 3 protrude from the enclosure.

FIG. 7-1 is a sectional view showing application 3 of the invention where the ultraviolet detector/indicator is installed in a photocatalyzed liquid processing apparatus comprising of an ultraviolet lamp for sterilization.

FIG. 7-2 is a sectional view showing light guide unit 2 of the ultraviolet detector/indicator of FIG. 7-1, which connects the light emitting front 4 and light receiving front 1 and is made of optical fiber.

Figures 1, 2, 8:
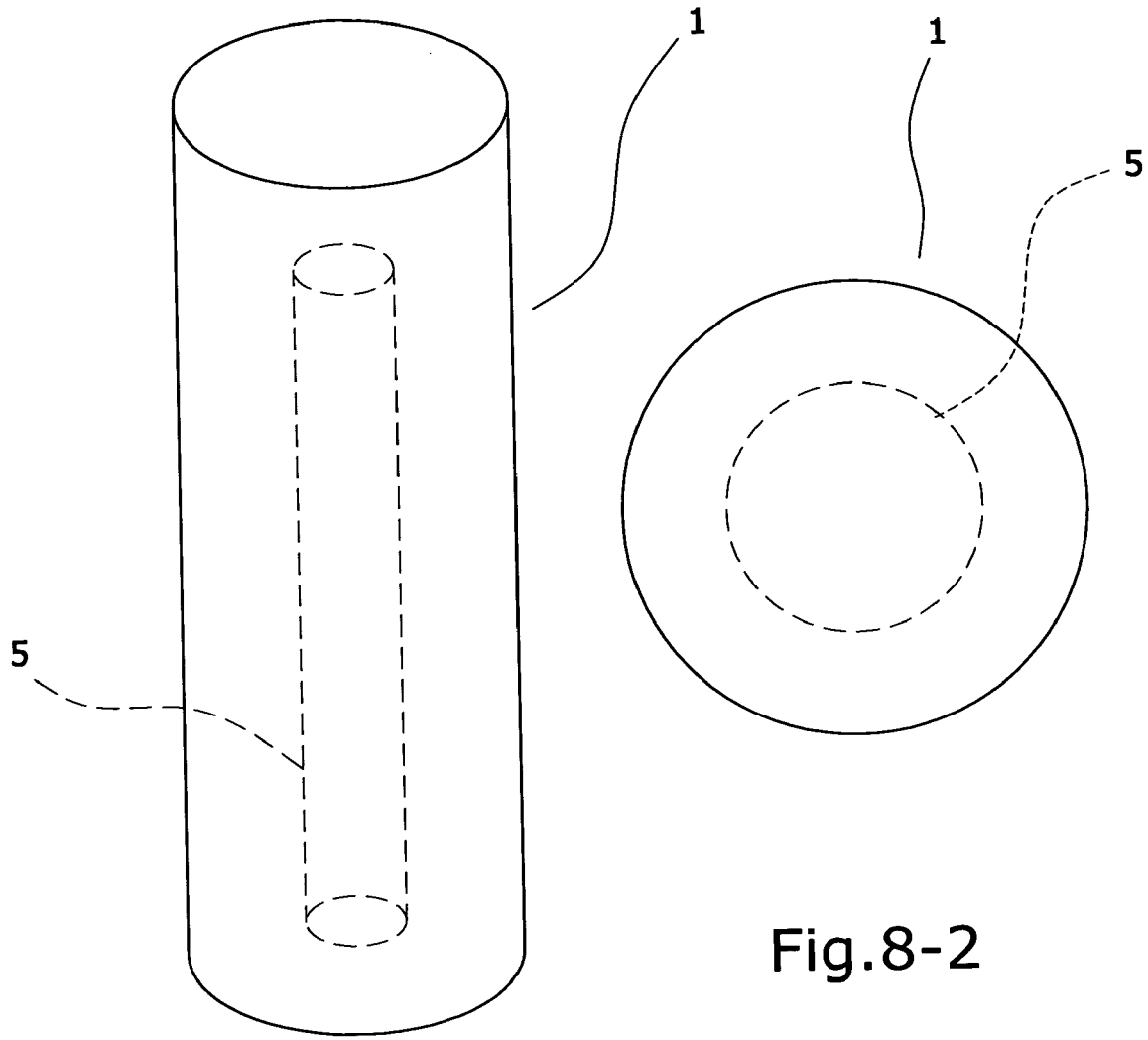

FIG. 8-1 and 8-2 are structural views of the light receiving fronts 1, wherein a hollow column and a sphere respectively contain the material 5 transferring ultraviolet energy into visible light. The material may be fluorescent powder.

Figure 9:
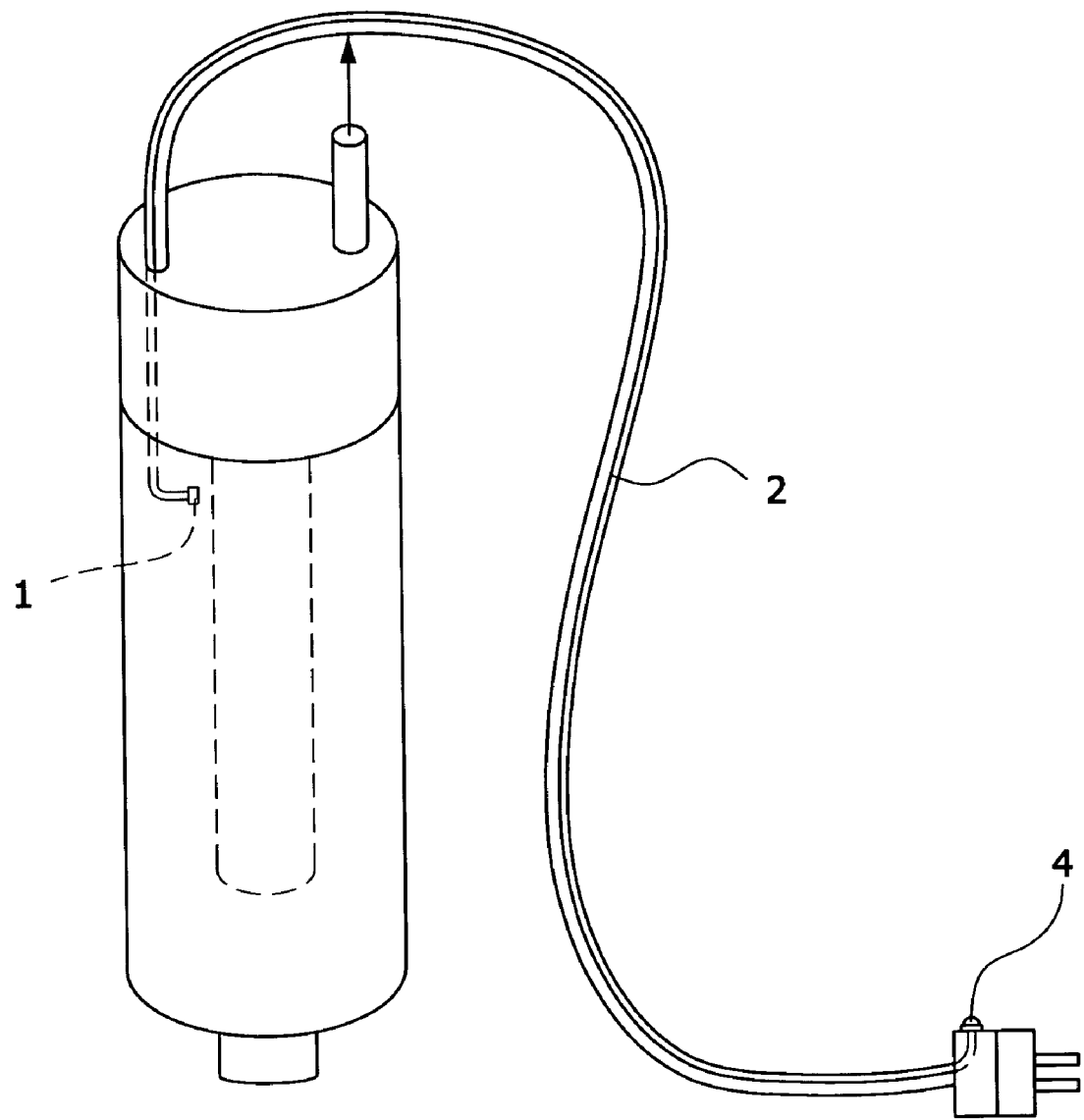
FIG. 9 is a sectional view showing that the light receiving front uses the optical fiber to have light emission at the remote end.

FIG. 9 is a sectional view showing application 4 of the invention where the ultraviolet detector/indicator is installed in a photocatalyzed liquid processing apparatus and the light receiving front 1 is connected to the light emitting front 4 at the remote end by a power cable and a flexible wired light guide unit 2, made of optical fiber.

To sum up, the ultraviolet detector/indicator of the invention comprises of a light receiving front 1, which is an object pervious to ultraviolet and contains the material 5 transferring ultraviolet energy into visible light. The material may be silica gel and its derivatives, PTFE (Polytetrafluoroethylene) and its derivatives, or PMMA (Poly Methyl Methacrylate) and its derivatives. Upon receiving the ultraviolet, the light receiving front 1 may transfer its energy via the material 5 into colored visible light to be emitted by the light emitting front 4 or transfer its energy via the light guide unit 2, which contains material that strengthens the ultraviolet or adjusts the spectrum into visible light to be emitted by the light emitting front 4. In addition, a colorimetric scale 3 printed with various color shades assists the user in verifying ultraviolet strengths lest aging or damage of the ultraviolet lamp should fail all the functions of the apparatus.

FIG. 10-1, 10-2, 10-3, 10-4, 10-5, and 10-6 are structural views of two embodiments of an interface 6, which connects to the upper or lower end where the enclosure is installed in the ultraviolet detector/indicator so as to effectively prevent aging or damage of the ultraviolet lamp from failing all the functions of the apparatus. The interface 6 also facilitates replacement of the ultraviolet detector/indicator installed in the enclosure, and can be a threaded cock 7.

In conclusion, the "ultraviolet detector/indicator" of the invention substantively prevents aging or damage of the ultraviolet lamp from failing all the functions of the apparatus so as to possess the "practicality" and the "advancement" in the industry field. Further, the structure of the invention has never been disclosed in any publication or for any utilization prior to this patent application. Therefore, the structure of the invention conforms to requirements of the new utility model and is submitted per this document for a patent application according to the Patent Act.

What is claimed is:

1. In combination,
    an enclosure of a fluid processing apparatus;
    an ultraviolet lamp installed in the enclosure for sterilization; and
    an ultraviolet detector/indicator installed at an external wall of the enclosure, wherein the ultraviolet detector/indicator comprises:
        a light receiving end to receive ultraviolet light from the ultraviolet lamp,
        a light emitting end disposed outside the enclosure,
        a light guide transmitting light between the two ends,
        material to transfer ultraviolet energy into visible light between the light receiving end and the light emitting end, the material adjusting a spectrum, and
        a colorimetric scale which is printed with various color shades disposed adjacent to at least one of the ends,
    whereby ultraviolet light inside the enclosure is indicated by visible light at the light emitting end.

2. The combination according to claim 1, wherein the light guide comprises an optical fiber.

3. The combination according to claim 2, comprising a power cable having a remote end, wherein the optical fiber is flexible and extends along the power cable, and wherein the light emitting end is located at the remote end of the power cable.

4. The combination according to claim 3, wherein the material to transfer ultraviolet energy into visible light adjusts a spectrum and a colorimetric scale which is printed with various color shades is disposed adjacent to at least one of the ends.

5. The combination according to claim 3, wherein the material to transfer ultraviolet energy into visible light adjusts a spectrum and a colorimetric scale which is printed with various color shades is disposed adjacent to at least one of the ends.

6. The combination according to claim 1, wherein the ultraviolet detector/indicator comprises a column.

7. The combination according to claim 6, wherein the column comprises a hollow column containing the material to transfer ultraviolet energy into visible light.

8. The combination according to claim 7, wherein the material to transfer ultraviolet energy into visible light comprises fluorescent powder.

9. The combination according to claim 1, comprising an interface which connects to an upper or a lower end where the ultraviolet detector/indicator is installed in the enclosure, whereby the ultraviolet detector/indicator is replaceably installed in the enclosure.

10. The combination according to claim 9, wherein the interface comprises a threaded cock.

11. The combination according to claim 1, wherein the colorimetric scale cinctures the wall of the enclosure.

12. The combination according to claim 1, wherein the ultraviolet detector/indicator comprises a ring and the colorimetric scale is embraced by the ring.

13. The combination according to claim 1, wherein the colorimetric scale sleeves a column.

14. The combination according to claim 1, wherein the ultraviolet detector/indicator comprises a cake.

15. The combination according to claim 1, wherein the fluid is liquid.

16. The combination according to claim 1, wherein the light receiving end, the light emitting end, and the light guide are separate units.

17. The combination according to claim 1, wherein the light receiving end, the light emitting end, and the light guide are integrated into a collective structure.

18. The combination according to claim 1, wherein the material to transfer ultraviolet energy into visible light is selected from the group consisting of silica gel and its derivatives, PTFE (Polytetrafluoroethylene) and its derivatives, and PMMA (Poly Methyl Methacrylate) and its derivatives.

19. The combination according to claim 1, comprising characters or signs, pervious or opaque to the ultraviolet, installed on the surface of the light emitting end.

* * * * *